2,806,127

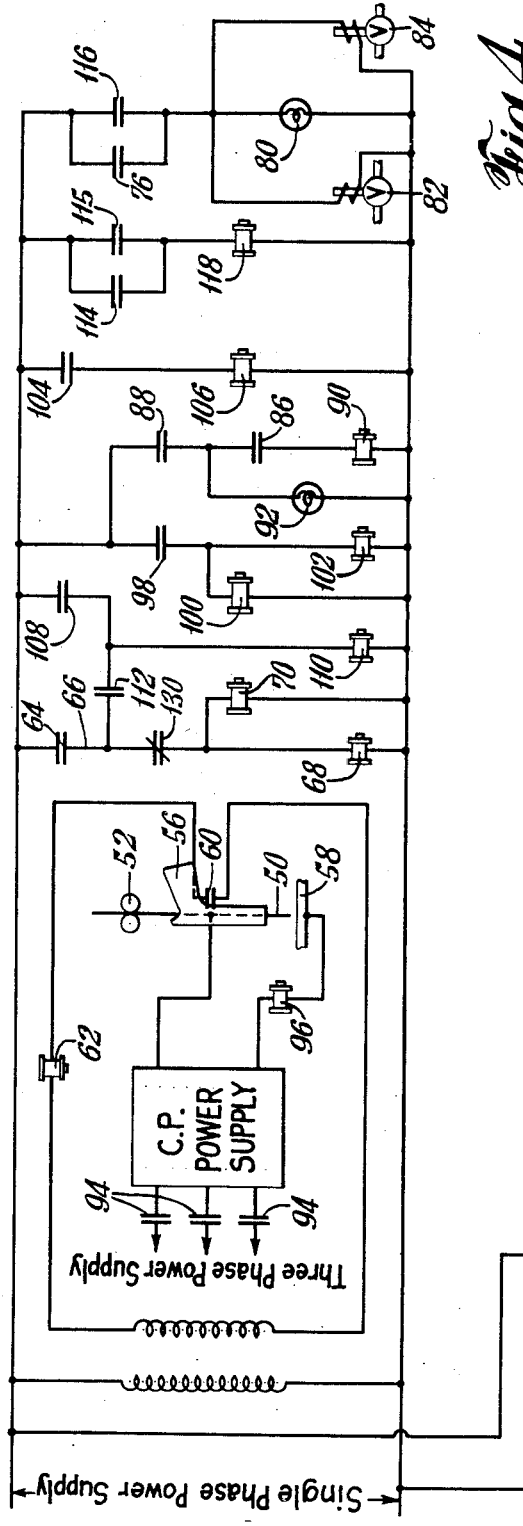
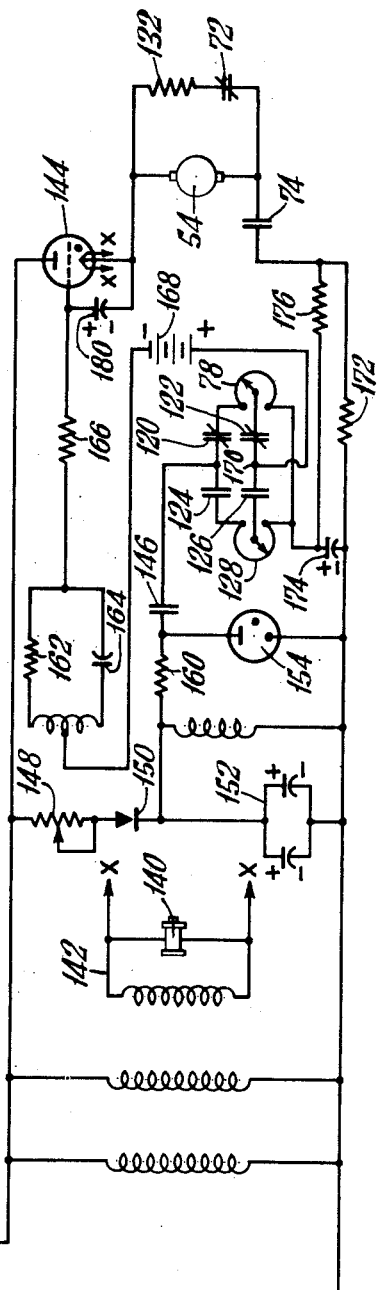
Fig. 4.
INVENTORS
ROBERT L. HACKMAN
ROSCOE R. LOBOSCO
WILBUR H. HELMBRECHT
BY
*Gerald R. O'Brien Jr.*
ATTORNEY

Patented Sept. 10, 1957

2,806,127

ELECTRIC ARC WELDING

Robert L. Hackman, Morris Plains, Roscoe R. Lobosco, Fanwood, and Wilbur Herman Helmbrecht, Union, N. J., assignors to Union Carbide Corporation, a corporation of New York Application October 29, 1954, Serial No. 465,478

4 Claims. (Cl. 219—137)

The present invention relates to electric arc welding and, more particularly, to a method of and apparatus for controlling continuously-fed consumable electrode electric arc welding operations.

In the control of electric arc welding operations employing continuously-fed consumable electrodes, many problems exist which have heretofore defied satisfactory solution. One of these problems relates to the starting of the welding operation.

For many years the "scratch start" method was employed to initiate the arc and begin the welding operation. In this method an energized stationary electrode is caused to contact the work and burn back to form an arc, and the voltage across the arc is then generally employed to control the rate of feed of the consumable electrode toward the work. Prior control systems employing this starting method were not capable of producing uniform welds; the quality, penetration, and similar characteristics of the initial weld being non-uniform due to starting with a stationary electrode.

It was then proposed that welds of better and more uniform quality in the zone of initiation of the weld could be obtained if controls enabling a "running start" were employed. In such processes the carriage of a welding machine was run across the work causing the stationary electrode to contact the workpiece and initiate the arc. This method employs what is in effect a modification of the "scratch start" and suffers from the same limitations of that method, except to a somewhat lesser degree.

In an attempt to solve this problem it was proposed to employ a welding method in which starting was accomplished by initially running the electrode into the workpiece at full welding electrode feed rate and strike an arc and begin the welding operation. Welding generators capable of producing such starts were developed and from some applications the approach was successful in producing welds having good characteristics. However, feeding the wire to the work at full electrode feed rate is not feasible or desirable in all cases for the following reasons:

1. Where large diameter wire is used or where the wire feed rate is high, the instantaneous starting current can reach very high values which can result in undesirable transients in the power supply and in the power line. In some cases, particularly with rectifier-type power supplies, the power line cannot supply the heavy starting surge which is required.

2. Since both the arc and the power supply take an appreciable time to stabilize the start is not always smooth.

3. On thin sections there is a possibility that the heavy starting current will melt through the work.

4. The arc is not always initiated between the end of the wire and the workpiece. It may start at any point along the wire between the wire and the guide tube. Sometimes the arc is initiated inside the guide tube itself. Any of these conditions can result in a false start or in freezing the wire to the guide tube.

Another problem which has long required completely satisfactory solution in the control of electric metal arc welding operations is the prevention of cratering or electrode sticking at the end of a welding operation. While this problem is generally troublesome in normal seam welding operations, it is particularly so in spot welding operations.

Interrupting an arc often presents special problems. For example, if both the arc current and the wire feed are turned off simultaneously, it may be impossible to stop the wire before it contacts the puddle where it may freeze to the puddle. If the wire feed is stopped and the arc current maintained until the arc is extinguished a burnback may occur. A power supply having a "drooping" volt-ampere characteristic is particularly susceptible to burnback. A burnback may occur even when the volt-ampere characteristic is substantially flat as in the case of constant potential.

It is, therefore, an object of the present invention to provide a method of and apparatus for electric arc welding wherein starting of the weld is accomplished without loss in quality of the resultant weld.

Another object is to provide a method of and apparatus for electric arc welding wherein stopping of the welding operation is accomplished without cratering of the weld or sticking of the electrode.

A further object is to provide such a method and apparatus which is generally adaptable for use in both continuous seam welding and spot welding operations.

Other aims and advantages of the invention will be apparent from the following descriptions and appended claims.

In the drawings:

Fig. 4 is an electric circuit diagram of a control circuit embodying the invention for use in controlling a spot welding operation.

In accordance with the electric arc welding method of the invention a consumable metal electrode is fed toward and in contact with the workpiece at a predetermined initial or "inching" rate, whereupon short circuit and arc initiation conditions are established. Upon the establishment of an arc and the burnback of the electrode wire to full wire cross-section, the weld wire feed rate is rapidly increased to a normal electrode wire feed rate at which it is maintained for the remainder of the welding operation. At the completion of the welding operation, the electrode wire feed is rapidly reduced with the electrode wire still energized.

Figure 2:
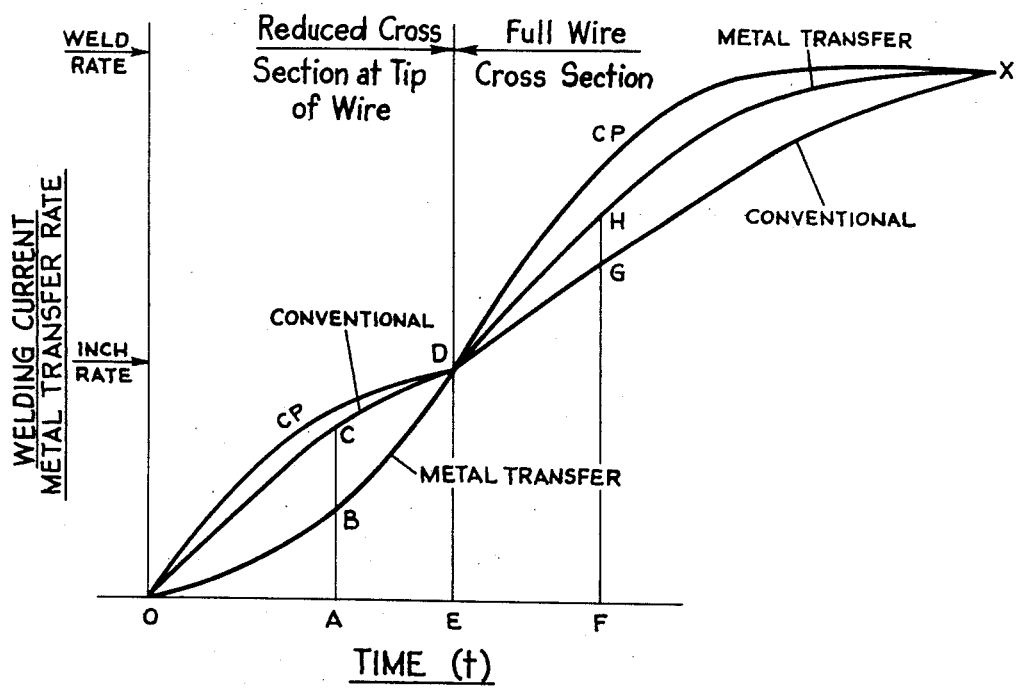
Fig. 2 is a graph of a set of curves showing metal transfer rate and current as a function of time.

In order to insure proper starting of the welding operation, it is important to consider the interrelationship of two factors which affect the mechanics of arc ignition, i. e. the characteristics of the power supply and the metal transfer rate. In the curves of Fig. 2 of the drawing, the ordinate represents the welding current, the metal transfer rate per unit of time, and the wire feed rate per unit of time. The abscissa represents time. One curve represents the change in metal transfer rate while the other two curves represent the surge current characteristics of a conventional "dropping" and a constant potential type power supply.

For purpose of illustration, it is assumed that the area under the metal transfer curve represents the amount of energy required to melt and transfer that metal. Similarly, an equivalent area under either of the power supply current characteristic curves ODX and OCDGX represents the same amount of energy supply by the power source. It follows then that, if the areas under both a metal transfer curve and a current characteristic curve are equal, the amount of energy supplied by the power source will equal the amount of energy required to melt and transfer the filler metal at the particular rate at which the metal is being consumed by the arc.

These statements are only completely accurate if it is assumed that the arc voltage is always constant. In reality the arc voltage must start from 0 at the point of short circuit and build up to the preset arc voltage. Therefore, at an early point in time in Fig. 2 the energy area projected under each curve representing each power source will tend to be something less than that shown in Fig. 2. However, it is well known to those skilled in the art that the energy supplied by the source when the wire feed rate is extremely low is still well in excess of the power requirements to melt and transfer the metal being supplied at that point in time.

Figure 3:
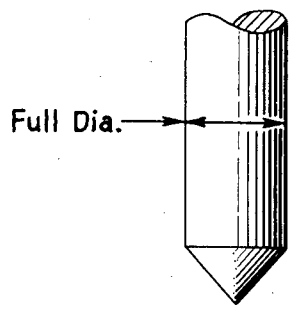
Fig. 3 is a view of the shape of electrode tip assumed in conjunction with the metal transfer rate-time curve of Fig. 2.

The shape of the metal transfer curve OBD is based on an assumption illustrated in Fig. 3 where the tip of the filler wire is shown as a sharp point. It is obvious that at the instant of arc ignition a very small cross section is presented for melting. Hence, the metal transfer curve OBD representing the volume of metal in the conical portion of the tip is shown as being concave downward. If the wire end had been severed with a wire cutter this assumption would be very close to actual fact.

If the electrode is presented to the workpiece for arc ignition with the end balled or hemispherical, as it would have been formed at the end of the previous welding operation, the assumption is still valid as the balled end would still present a point contact to the weldment and its cross section would be still materially reduced over that of the full cross section of the filler wire.

It, therefore, may be seen from the curves of Fig. 2 of the drawing that the surge current characteristics are extremely important in selecting a proper source capable of providing energy to the welding process at a rate sufficient to meet the metal transfer rate required.

Curve DHX represents metal transfer during acceleration from the initial or "inch" wire feed rate at point D to the full welding wire feed rate at point X, the shape of this curve is based on the usual acceleration characteristics of the electric motors used as wire feed motors in welding equipment. Curve OCD represents the surge current development rate of a conventional "dropping" volt-ampere characteristic power source. Similarly, the curve marked constant potential (CP) represents the surge current development rate of a constant potential type power source.

The area OAB represents pounds of metal melted and transferred in time OA while curve OAC represents the amount of energy available from a conventional "drooping" type power supply to accomplish the melting and transfer in time OA. This latter area OAC represents watts.

Area OAC exceeds area OAB hence arc ignition and maintenance of the arc in time OA can be accomplished. As the current curve ADX of the CP type power source lies above that of the conventional power source ACDGX, it is obviously true that excess power over the demand is available.

At point E in time it is assumed that the wire has been melted back exposing its full cross-section for melting and transfer. At this same point in time the electrode wire feed rate is accelerated to the full feed rate required for welding. If these two mechanisms—melting back to the full diameter of the filter wire and acceleration of the wire feed rate to full welding feed rate—had not occurred simultaneously, it would in no way affect the end result providing that the point of acceleration to full feed rate does occur earlier in time than point E.

The area DEFG represents the power available from a conventional power source during filler wire acceleration to an increased value of welding wire speed. This area DEFG should be compared with area DEFH which represents the amount of metal which should be melted and transferred during the period of time from E to F.

In this particular case the power requirement exceeds the available power hence the arc will be extinguished. On the other hand, if a constant potential power source is used instead of the conventional power source, a new power area would be developed by extending line FH upward to intersect CP curve DX. Then the power available would be in excess of that required for metal melting and transfer during the period of time from E to F. The inability of the conventional power supply to deliver sufficient energy within the required time is because of the high rate of wire feed acceleration needed to reach a high welding rate.

Accordingly, in order to provide the power necessary to match the acceleration of electrode wire feed rate required in the method of the invention it is imperative that a source be employed having proper surge current characteristics.

Upon the attainment of full welding electrode feed rate, the welding method of the invention operates in the conventional manner well known to the art until stopping of the welding operation is desired. Thereupon, the rate of feed of the electrode wire is decelerated to a stop with the wire fully energized. Accordingly, the characteristics of the power supply play a vital role in stopping as well as in starting. A power source having dynamic volt-ampere characteristics in which the output voltage does not substantially decrease with increasing current over the operable current range is required to attain beneficial stopping. This is required since, with rapid rod deceleration, the characteristics of the source must permit current decay over a finite period of time without a corresponding voltage increase which would cause burnback. Also, if the power source had such volt-ampere characteristics requiring rapid deenergization of the electrode rod to prevent burnback, the current decay would be insufficient to prevent cratering.

The control method of the present invention may be employed with any known process employing a continuously-fed consumable electrode wire with equally effective results. For example, the method may be employed in submerged melt welding, shielded inert gas metal arc welding, to mention a few.

Figure 1:
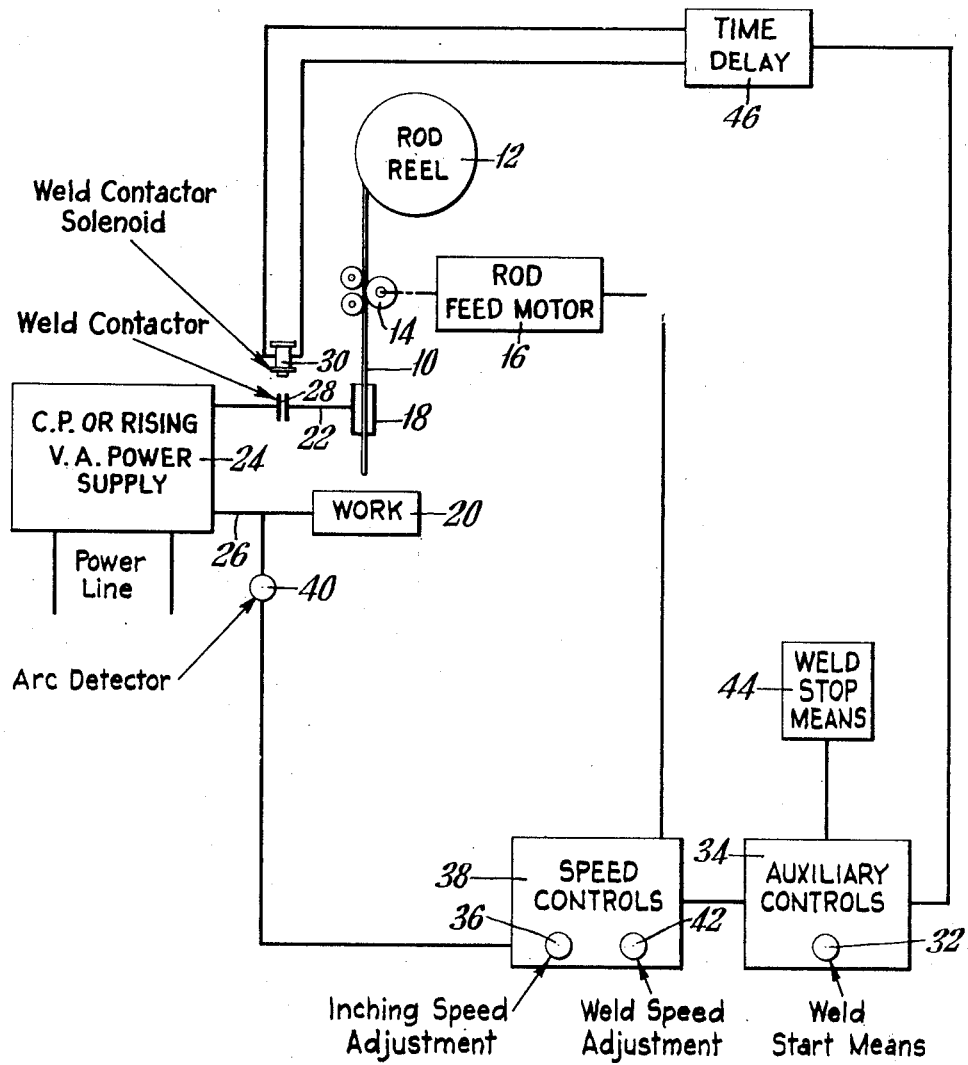
Fig. 1 is a schematic view of control apparatus embodying the invention and suitable for producing continuous seam welds.

Apparatus suitable for practicing the welding control method of the invention for continuous seam welding operations is shown schematically in Fig. 1 of the drawings. As there shown, a continuously-fed consumable metal electrode 10 is drawn from rod 12 by means of feed rolls 14 driven by rod feed motor 16. The electrode 10 is fed through welding gun 18 toward the work 20. Energization of the electrode 10 is accomplished as it passes through gun 18 through line 22 from power source 24 of constant potential (substantially flat) or rising volt-ampere characteristics, and the welding circuit is completed through line 26 to the work 20.

The welding circuit contains weld contactor 28 energized by solenoid 30 in the control circuit.

To begin the welding operation weld start means 32 in auxiliary control circuit 34 is actuated, causing the energization of weld contactor solenoid 30 thereby closing the welding contactor 28 and energizing electrode 10. Concurrently therewith, rod feed motor 16 is energized causing feeding of electrode 10 toward work 20 at a predetermined inching speed set by inching speed adjustment 36 in speed control circuit 38. When the electrode 10 strikes the work 20, the arc is initiated and its presence is detected by arc detector 40 in the control circuit. In response to arc initiation arc detector 40, containing a current relay or other suitable means, actuates speed control circuit 38 to change the speed of the rod feed motor to normal full welding speed as determined by the setting of weld speed adjustment 42 in the speed control circuit 38.

Thereafter, the conventional welding operation is performed at full welding speed until stopping is desired. To stop the welding operation, weld stop means 44 in auxiliary control circuit 34 is actuated causing de-energization of rod feed motor 12 whereupon the rod feed motor is either allowed to coast to a stop or is decelerated by means of dynamic braking means. Weld stop means 44 also actuates time delay circuit 46 which de-energizes weld contactor solenoid 30 at the end of a predetermined period, thereby opening the welding circuit and de-energizing electrode 10. In this manner the electrode is allowed to come to a stop before de-energization, thereby insuring against cratering and freezing of the electrode in the weld puddle.

The following Table I sets forth results of gas shielded metal arc continuous seam welding runs performed on carbon and stainless steels employing the method of the present invention and apparatus similar to that described hereinabove and shown in Fig. 1 of the drawings.

Table I

| Work | 3/16" to 3/16" carbon steel. | 1/8" to 1/8" stainless steel. |
|---|---|---|
| Type of Weld | lap fillet joint | butt joint. |
| Current | 300 amp | 258 amp. |
| Voltage | 24 volts | 21 volts. |
| Rod | 1/16" No. 65 | 1/16" No. 410. |
| Shielding Gas | 95% Argon—5% Oxygen. | 95% Argon—5% Oxygen. |
| Gas Flow Rate | 50 C. F. H. | 35 C. F. H. |
| Rod Inch Speed | 40 I. P. M. | 40 I. P. M. |
| Rod Weld Speed | 160 I. P. M. | 272 I. P. M. |
| Weld Progression Rate | 45 I. P. M. | 40 I. P. M. |

A circuit diagram of a modified system suitable for practising the method of the invention for a shielded inert gas metal arc spot welding operation is shown in Fig. 4 of the drawings. As there shown, a continuously-fed consumable metal electrode 50 is fed through driving rolls 52, driven by a rod feed motor 54, through a welding gun 56 and toward the work 58. The control circuit is actuated by switch 60 in welding gun 56, the closing of which energizes solenoid 62 which, in turn, closes normally open contactors 64 in line 66. With contactors 64 closed, locking relay solenoid 68 and anti-cratering anti-stick time delay solenoid 70 are actuated thereby opening normally-closed contactors 72 and closing normally-open contactors 74 and 76. The opening of contactor 72 (which opens the dynamic brake circuit of wire feed motor 54) and closing of contactors 74 causes the wire feed motor to feed wire at a speed preset by inch speed potentiometer 78. Contactors 76 complete the circuit for the pilot light 80 and shielding gas and cooling water solenoids 82 and 84, respectively. Contactors 86 close, but the welding contactor circuit is not energized unless or until water flow switch 88 is closed. After a momentary delay to permit the water flow to reach a proper volume, contactors 88 close and complete the circuit to welding solenoid 90 and pilot light 92. The energization of welding solenoid 90 closes contactors 94 in the welding circuit and electrode wire 50 is energized and is now feeding slowly to the weldment 58.

When the welding wire strikes weldment 58, current flows in the welding circuit, the arc is initiated, and welding current relay 96 is energized and contacts 98 close to complete the circuit to solenoid 100 of the wire speed relay and solenoid 102 of the shielding gas-and-water timer. Contactors 104 close completing circuit to the auxiliary shielding gas and water and timing relay 106. In turn, contacts 108 close energizing the unlocking relay 110 and as a result closing contacts 112. As long as switch 60 is held closed thus holding relay 62 in, and keeping its contacts 64 closed, unlocking relay 110 is locked in through its own contacts 112. This circuit arrangement prevents recycling at the end of each spot weld.

Upon the previous energization of relay 106, contactors 114 and 116 have also closed. Contactors 114 close in parallel with contactors 115 and energize the weld timer 118. Contactor 116 closes in parallel with contactors 76 which are already closed and thus performs no additional function in that circuit at this point in the welding cycle.

The wire speed relay 100 having been energized, above, opens its contacts 120 and 122, and closes its contacts 124 and 126. This latter operation switches the wire feed motor from preset inching speed potentiometer 78 to the preset welding speed potentiometer 128. As a result the welding wire now accelerates to the full welding feed rate.

The weld cycle is timed out and the next part of the complete cycle started by the weld timer relay 118. Contactor 130 in series with locking relay 68 and anti-stick timing delay relay 70 opens and these latter two relays are de-energized. Relay 70 starts timing upon being de-energized; thus, at this point relay 70 starts timing the anti-stick anti-crater cycle. This function is accomplished by holding in the weld relay 90 with contacts 86 after the wire feed has been stopped by contacts 74 and 72 which are acting simultaneously with contact 86. Contacts 74 open the armature circuit of the wire feed motor while contacts 72 return to the normally-closed position and place dynamic brake resistor 132 across the wire feed motor armature. This latter function eliminates uncontrolled coasting of the electrode wire. Contacts 76 in, shielding gas and water solenoid circuits open, but contacts 116 in parallel with contacts 76 remain closed and so contacts 76 perform no function by opening at this point in the cycle. In other words, the shielding gas and water solenoid circuits are energized by contacts 76 and de-energized by contacts 116.

The anti-stick, anti-crater portion of the cycle is now completed by relay 70 timing out and de-energizing the welding wire by opening contacts 86 and thereby de-enrgizing the welding relay 90. Relay 70 is preset so that the wire will be de-energized when it has burned back sufficiently clear of the spot weld. As this process is operated in conjunction with the constant potential or rising volt-ampere characteristic type power sources, the continued consumption of welding wire after the feeding has stopped will cause a characteristic current decay in the output of this type power source. This current decay reduces the arc force on the molten puddle and thus eliminates cratering.

Upon completion of the anti-stick anti-crater cycle the arc is extinguished, no welding current flows, and welding current relay 96 is de-energized. Contacts 98 open and de-energize wire speed relay 100 and shielding gas-water timer relay 106. Contacts 124 and 126 open and contacts 120 and 122 close returning the wire feed motor governor circuit to potentiometer 78 preset for inch speed. However, the armature circuit to the governor has already been opened by contacts 74 and the dynamic brake applied by contacts 72 so this operation of these latter contacts performs no function at this point in the welding cycle.

Upon being de-energized relay 106 starts timing in a manner similar to the operation of relay 70 described above.

The shielding gas and water post-flow cycle is completed when relay 102 times out. This causes contacts 104 to open and de-energize shielding gas and water timing relay 106. Contacts 108 open and de-energize unlocking relay 110 if switch 60 has been permitted to open; otherwise relay 110 is held in, in series with its own contacts 112, and 64. Contactor 114 opens and de-energizes relay 118 which amounts to unlocking this relay and permitting it to return to its normal rest position preparatory to timing the next cycle. This causes contacts 130 to close. However, if switch 60 is still held closed thus holding in relay 60 and the contacts 115 will remain closed in parallel with contacts 114 and hold relay 118 locked in the energized position which will in turn hold open contacts 130 to prevent recycling. Contacts 116 also open at this point and the shielding gas, water solenoids 82 and 84, and pilot light 80 are de-energized.

If switch 60 has been released previously, the complete circuit is now de-energized, while if it is still held closed relays 110 and 118 will remain energized until it is released.

These interlocking circuits perform an additional function in addition to avoiding recycling. Once the arc has been extinguished, the operator may attempt to conserve the shielding gas post-flow protection and start a new cycle. With this circuit this is not possible as a cycle cannot be started until contactor 130 recloses.

As a safety feature this circuit will "fail safe" if the operator pulls the welding gun away from the weldment, thereby releasing switch 60. The welding wire will stop feeding and will be de-energized. Thus the welding cycle itself may be stopped at any point in the interest of safety.

Thermal time delay relay 140 in the filament circuit 142 of vacuum tube 144 controls contactor 146 in the rod feed motor control circuit and thus prevents the passage of current on the plate circuit until the filament of tube 144 has reached proper operating temperature. The circuit comprising resistor 148, rectifier 150, and parallel condenser filter arrangement 152 is provided for supplying a proper rectified voltage to the wire feed motor field; and voltage regulator 154 is provided to supply a stable voltage for the rod feed motor reference voltage circuit. Resistor 160 is a current limiting resistor provided to protect the voltage regulator tube 154. A phase shift circuit is provided in the grid circuit of tube 144 and comprises resistor 162 and condenser 164 and a current limiting resistor 166 is also provided. Battery 168 is provided in the grid circuit of tube 144 and the voltage fed to the phase shift circuit is the electrical sum of the voltage of battery 168 and the difference between the reference voltage appearing at point 170 in the control circuit and the feed-back voltage appearing across resistor 172 in the motor armature circuit. A filtering condenser 174 is provided in the armature circuit and serves to filter back E. M. F. from the armature to give an average value. A resistor 176 is provided in parallel with the series combination of resistor 172 and condenser 174 to set at a minimum the resistance for the circuit through the potentiometers. A by-pass condenser 180 is provided between the grid and cathode of tube 144.

The following Table II sets forth results of gas-shielded metal arc spot welding runs performed on various materials using the method of the present invention and apparatus similar to that described herein and shown in Fig. 4 of the drawings.

arc of 1.0 volts per 83 amperes (including the drop in 40 feet of 4/0 copper welding cable). It can be seen from the above that the welding source has substantially flat volt-ampere characteristics in the usable welding current range and well beyond.

What is claimed is:

1. In the art of electric arc welding, wherein a consumable continuous metal electrode is fed toward the work to establish and maintain an arc and the welding circuit is energized from a power source to said electrode and said work, the improvement which comprises employing a power source having dynamic volt-ampere characteristics such that the output voltage delivered to the arc does not decrease substantially with increasing output current in the usable current range and the surge current characteristics are such to permit instantaneous arc ignition and maintenance upon contact of the electrode with the work; feeding said electrode toward said work at a preselected inching feed rate less than normal welding feed rate at least to initiate said arc and burn said electrode back to approximately full electrode cross-section; accelerating said electrode feed rate to a preselected normal welding feed rate upon establishment of said arc and said burnback of said electrode; and maintaining said arc and said normal welding feed rate of said electrode to complete the welding of said work.

2. In electric arc welding, wherein a consumable continuous metal electrode is fed toward the work to establish and maintain an arc and the welding circuit is completed from a power source to said electrode and said work, the method which comprises employing a power source having dynamic volt-ampere characteristics such that the output voltage delivered to the arc does not substantially decrease with increasing output current in the usable current range and the surge current characteristics are such to permit instantaneous arc ignition and maintenance upon contact of the electrode with the work; feeding said electrode toward said work at a preselected inching feed rate less than normal welding feed rate to initiate said arc and burn said electrode back to approximately full electrode cross-section; accelerating said electrode feed rate to a preselected normal welding feed rate at least upon establishment of said arc and said burnback of said electrode; maintaining said arc and said normal welding feed rate of said electrode to complete the welding of said work; and, at the completion of said welding of said work, decelerating said electrode feed rate while continuing said energizing of said welding circuit.

3. In electric arc welding, apparatus for automatically controlling the rate of feed of a consumable continuous metal electrode toward the work comprising, a power source having dynamic volt-ampere characteristics such that the output voltage delivered to the arc does not sub-

*Table II*

| Material (Type and Thickness). | Stainless Steel—12 ga. to 12 ga. | Stainless Steel—14 ga. to 14 ga. | Galvanized Steel Sheet—16 ga. to ⅛ in. | Carbon Steel—⅛" sheet to ⅛" thick angle iron. |
|---|---|---|---|---|
| Shielding Gas | 95% Argon—5% O$_2$ | 95% Argon—5% O$_2$ | Argon | 95% Argon—5% O$_2$. |
| Shielding Gas (C. F. H.) | 20 | 20 | 20 | 20. |
| Welding Wire (dia.) | 1/16" | 1/16" | 1/16" | 1/16". |
| Welding Wire | No. 60 Heat No. 2x7612. | No. 60 Heat No. 2x7612. | No. 26 Everdur | No. 32 cms. |
| Welding Voltage (volts) | 27 | 27 | 28 | 20. |
| Welding Current (amps) | 360 | 320 | 280 | 350. |
| Wire Inch Speed (in./min.) | 43 | 53 | 20 | 50. |
| Wire Welding Speed (in./min.) | 330 | 292 | 250 | 370. |
| Welding Wire per Spot (in.) | 2.75 | 2.60 | 4.62 | 4.2. |
| Welding Time (sec.) | 0.6 | 0.5 | 0.6 | 0.9. |
| Total Time [1] (sec.) | 4.3 | 3.9 | 3 | 6.2. |

[1] Total time includes inch time and argon post flow time.

The power source employed in all runs of Tables I and II was a Westinghouse RCP welder of the rectifier, constant potential type (500 amperes D. C. continuous duty). This power source has an open circuit voltage range of from 14.5 to 40.5 volts, and volt-ampere characteristic at stantially decrease with increasing output current in the usable current range and the surge current characteristics are such to permit instantaneous arc ignition and maintenance upon contact of the electrode with the work; variable speed drive means for continuously feeding said electrode toward said work; control circuit means for varying the speed of said drive means to feed said electrode first at a preselected inching feed rate less than normal welding feed rate, and then, upon arc ignition and electrode burnback to full electrode cross-section, at preselected normal welding feed rate; and arc detector means responsive to the initiation of an arc and operable to actuate said control circuit means to increase the speed of said drive means and increase the feed of said electrode from said inching feed rate to normal welding feed rate.

4. Apparatus in accordance with claim 3, also having timing means associated with said control circuit means adapted to interrupt the feed of said electrode at the end of a predetermined interval to accomplish a spot welding operation, and anti-recycling circuit means associated with said control circuit means to prevent recycling of said spot welding operation.

References Cited in the file of this patent

UNITED STATES PATENTS

| | | |
|---|---|---|
| 1,701,372 | Jefts | Feb. 5, 1929 |
| 1,898,060 | Noble | Feb. 21, 1933 |
| 1,976,551 | Frick | Oct. 9, 1934 |
| 2,311,462 | Neal | Feb. 16, 1943 |
| 2,364,920 | Shaffer | Dec. 12, 1944 |
| 2,371,894 | Kennedy | Mar. 20, 1945 |
| 2,397,182 | Jenks | Mar. 26, 1946 |
| 2,430,055 | Kennedy | Nov. 4, 1947 |
| 2,444,834 | Landis et al. | July 6, 1948 |
| 2,460,990 | Kratz et al. | Feb. 8, 1949 |
| 2,680,181 | Tuthill | June 1, 1954 |